(12) United States Patent
Bochud et al.

(10) Patent No.: US 7,828,906 B2
(45) Date of Patent: Nov. 9, 2010

(54) TURBINE CLEANING METHOD

(75) Inventors: Dominique Bochud, Wettingen (CH); Christoph Mathey, Fislisbach (CH)

(73) Assignee: ABB Turbo Systems AG, Baden (CH)

( * ) Notice: Subject to any disclaimer, the term of this patent is extended or adjusted under 35 U.S.C. 154(b) by 216 days.

(21) Appl. No.: 12/050,743

(22) Filed: Mar. 18, 2008

(65) Prior Publication Data
US 2008/0210264 A1    Sep. 4, 2008

Related U.S. Application Data

(63) Continuation of application No. PCT/CH2006/000514, filed on Sep. 22, 2006.

(30) Foreign Application Priority Data
Sep. 30, 2005   (CH)   ..................... 1583/05

(51) Int. Cl.
*B08B 3/02*    (2006.01)
(52) U.S. Cl. .................. 134/22.18; 134/23; 134/32; 134/33; 134/37
(58) Field of Classification Search .............. 134/21.1, 134/21.12, 34, 35, 22.1, 22.11, 22.18, 23, 134/31, 32, 33, 37
See application file for complete search history.

(56) References Cited

U.S. PATENT DOCUMENTS 3,369,533 A * 2/1968 De Pietro ................ 123/495
4,548,040 A    10/1985 Miller et al.
5,944,483 A * 8/1999 Beck et al. ................ 415/117

FOREIGN PATENT DOCUMENTS

DE    35 15 825 A1    11/1985
EP    0 781 897 A2    7/1997

OTHER PUBLICATIONS

International Search Report for PCT/CH2006/000514, dated Dec. 6, 2006 (in German).
Written Opinion of the International Searching Authority for PCT/CH2006/000514 (in German).

* cited by examiner

*Primary Examiner*—Michael Barr
*Assistant Examiner*—Saeed T Chaudhry
(74) *Attorney, Agent, or Firm*—Buchanan Ingersoll & Rooney PC

(57) ABSTRACT

Depending on the actual operating situation and the composition of the fuels used for driving the internal combustion engine, contamination of the moving blades, of the guide device and of the turbine casing parts occurs sooner or later in the exhaust gas turbine. According to the invention, a small quantity of cleaning fluid is fed continuously or cyclically into the exhaust gas flow of an exhaust gas turbine and is directed onto the components to be cleaned. The small quantity of cleaning fluid can be fed in with unchanged operation of the internal combustion engine, such that the exhaust gas turbine can be cleaned or kept clean within the entire operating range of the internal combustion engine. Fluctuations in the power output of the internal combustion engine on account of requisite cleaning of the exhaust gas turbine therefore do not occur. Furthermore, the formation of thermostress cracks in the critical turbine casing parts is largely avoided.

15 Claims, No Drawings

TURBINE CLEANING METHOD

TECHNICAL FIELD

The invention refers to the field of turbomachines which are charged with exhaust gases of internal combustion engines. It relates to a cleaning method for cleaning an exhaust gas turbine.

Exhaust gas turbines are used in exhaust gas turbochargers for charging internal combustion engines, or in power turbines for converting the energy which is contained in the exhaust gases of internal combustion engines into mechanical or electrical energy.

In dependence upon the concrete operating situation and the composition of the fuels which are used for driving the internal combustion engine, contamination of the turbine blades on the impeller, of the stator blades of the nozzle ring and of the various turbine casing components, sooner or later occurs in the exhaust gas turbine. Such contaminant deposits lead to a poorer turbine efficiency in the region of the nozzle ring inter alia, and consequently to the reduction of power output of the subsequent machines, for example of the compressor which is driven by means of the exhaust gas turbine, and of the charged internal combustion engine itself. As a consequence of it, an increase of the exhaust gas temperatures in the combustion chamber occurs, as a result of which both the internal combustion engine and the turbocharger can be thermally overstressed. In the case of the internal combustion engine in particular, damage or even destruction of the exhaust valves can occur.

If a contaminant layer is deposited on the nozzle ring and on the turbine blades of a turbocharger which is connected to a four-stroke internal combustion engine, then an increasing of the turbocharger speed and consequently of the charging pressure and of the cylinder pressure is also to be taken into account. As a result, both components of the internal combustion engine and of the turbocharger are also mechanically more highly stressed, in addition to the increased thermal stress, which can also lead to destruction of the affected components.

With irregular distribution of the contaminant layer on the periphery of the rotor blades of the turbine wheel, an increase of the unbalance of the rotor occurs, as a result of which the bearing assembly can also be damaged.

If, on the turbine casing, contaminant deposits occur on the outer contour of the flow passage which extends in the region radially outside the turbine blades, contact can occur during operation on account of the reduced radial clearance between turbine blades and turbine casing, which can damage the turbine blades and, in the extreme case, make the turbine blades unserviceable.

Therefore, nozzle ring, turbine blades and affected regions of the turbine casing must be regularly freed of contaminants which adhere to them.

BACKGROUND OF THE INVENTION

A method and a device for cleaning the rotor blades and the nozzle ring of the axial turbine of an exhaust gas turbocharger are known from DE 35 15 825 A1. The cleaning device comprises a plurality of water nozzles which are arranged on the gas intake casing of the axial turbine and reach into the flow passage, and water piping. With a defined degree of contamination of the axial turbine, a cleaning requirement is sensed via a measuring and evaluating unit. Accordingly, water is injected into the flow passage via the nozzles which are arranged upstream of the stator blades. The water droplets which result in the process are transported by the exhaust gas flow to the stator blades or rotor blades of the axial turbine and cleanse these of the adhering contaminants. During a relatively short cleaning interval, a large quantity of cleaning fluid (about 3 l/min of cleaning fluid per $m^3$/s of exhaust gas) is fed into the flow in the process in order to achieve a cleaning which is as thorough as possible. With this cleaning method, the engine load must be reduced at an early stage and during the entire cleaning process on account of the large quantity of water. This is necessary in order to avoid an unacceptably large increase of the exhaust gas temperatures during the cleaning process. An excessive increase of the exhaust gas temperatures during the cleaning process leads to thermal overstressing of the exhaust gas turbines and of the internal combustion engine.

It is also known from the prior art that in the starting phase of injecting cold cleaning fluid in high quantity (cf. above) onto the hot stator blades of the nozzle ring and rotor blades of the turbine wheel, an additional thermoshock cleaning effect can be achieved.

Not only the stator blades of the nozzle ring and the rotor blades of the turbine wheel, but also the turbine casing components are thermally very heavily stressed during the thermoshock cleaning. Avoiding the formation of unacceptably high thermal stresses, or even cracks, in the corresponding components is constructionally very expensive, requires elaborate control of the cleaning, and as a result gives rise to high costs.

BRIEF SUMMARY OF THE INVENTION

The object of the present invention is to create a cleaning method for cleaning an exhaust gas turbine, with which an exhaust gas turbine can be kept clean, or can be cleaned, automatically and with lasting effect in the entire operating range of the internal combustion engine.

According to the invention, a small quantity of cleaning fluid is continuously fed, or fed in a timed manner, into the exhaust gas flow and guided onto the components of the exhaust gas turbines (stator element, turbine blade and relevant turbine casing components) which are to be cleaned.

The small quantity of cleaning fluid causes only an insignificant reduction of the power output of the exhaust gas turbine or increase of the exhaust gas temperatures, and can be fed during unaltered operation of the internal combustion engine so that the cleaning, or keeping clean, of the exhaust gas turbine can be carried out in the entire operating range of the internal combustion engine. Fluctuations in the output of the internal combustion engine are therefore absent due to the exhaust gas turbine cleaning which has become necessary.

Due to the continuously humidified exhaust gas flow, thermal stresses, and thermal stress cracks which are caused as a result of it, in the stator blades and rotor blades, and in the critical turbine casing components, are largely prevented. Moreover, the humidified exhaust gas flow leads to less heavy deposits on the components of the exhaust gas turbines which are to be cleaned.

WAY OF IMPLEMENTING THE INVENTION

According to the invention, small quantities of cleaning fluid are fed to the flow passage of an exhaust gas turbine upstream of the stator arrangement and of the rotor blades of the turbine wheel. Consequently, the humidity of the exhaust gas is increased, with which a cleaning action, or keeping clean action, along the further flow path through the exhaust gas turbine is achieved. The cleaning fluid, which as a rule is water or water mixed with a substance which promotes cleaning, is controlled and injected in small quantities into the flow passage.

This takes place according to the invention continuously or else in a periodically timed manner during the entire operating time of the exhaust gas turbine. Therefore, differentiation is no longer made between operating period and cleaning period, and the power output of the internal combustion engine which charges the exhaust gas turbine with exhaust gases no longer needs to be specially reduced for the cleaning of the exhaust gas turbine. In the case of timed injection, cleaning fluid is injected into the flow passage in intervals of several seconds and for several seconds in each case.

The quantity of injected cleaning fluid can be varied in dependence upon, for example, the output of the internal combustion engine or upon the exhaust gas flow, so that with low output in partial load operation a smaller quantity of cleaning fluid is injected than during full load operation. The quantity of cleaning fluid is advantageously varied in proportion to the engine power output. In the case of timed injection, the quantity of injected cleaning fluid, with a constant nozzle jet, can also be controlled by varying the injecting duration or the intervals between them.

With the method according to the invention, about 0.1 up to a maximum of 1.0 liter of cleaning fluid per 1 $m^3/s$ of exhaust gas are injected into the flow passage per minute.

Undesired thermal stresses or thermal stress cracks can be avoided not only due to the continuous injection but also due to the small quantity of cleaning fluid and the improved mixing with the hot exhaust gas which is associated with it.

Additional thermal unloading is consequently achieved by the cleaning fluid being heated before injecting into the flow passage. For heating the cleaning fluid, residual heat from the exhaust gas of the internal combustion engine is advantageously used.

In operation as an exhaust gas turbine of a turbocharger for charging the internal combustion engine, by the cleaning method according to the invention the components of the exhaust gas turbine can be thermally unloaded with lasting effect, and output losses of the turbocharger and negative influences upon the operating values of the internal combustion engine which result from it, can be reduced or completely prevented. Moreover, periodic output reductions of the internal combustion engine which are contingent upon the injection of large quantities of cleaning fluids and which interrupt normal operation, are inapplicable.

The invention claimed is:

1. A cleaning method for cleaning an exhaust gas turbine which is charged with exhaust gases of an internal combustion engine, wherein the exhaust gases in a flow passage are guided onto the rotor blades of a turbine wheel, in which cleaning method a cleaning liquid is injected into the flow passage, wherein during an entire operating time of the exhaust gas turbine, cleaning liquid is injected into the flow passage, thus the timing of the injection of the cleaning fluid being independent of the operating point of the internal combustion engine.

2. The cleaning method as claimed in claim 1, wherein the cleaning liquid is continuously injected into the flow passage during unaltered operation of the exhaust gas turbine.

3. The cleaning method as claimed in claim 1, wherein the cleaning liquid is periodically injected into the flow passage in a timed manner in intervals of several seconds and for several seconds in each case.

4. The cleaning method as claimed in claim 1, wherein the quantity of injected cleaning liquid can be varied, and is selected in dependence upon the power output which is currently delivered by the internal combustion engine in each case.

5. The cleaning method as claimed in claim 1, wherein the cleaning liquid is heated before injecting into the flow passage.

6. The cleaning method as claimed in claim 1, wherein the quantity of injected cleaning liquid is 0.1-1.0 liter/min per $m^3/s$ of exhaust gas.

7. The cleaning method as claimed in claim 2, wherein the quantity of injected cleaning liquid can be varied, and is selected in dependence upon the power output which is currently delivered by the internal combustion engine in each case.

8. The cleaning method as claimed in claim 3, wherein the quantity of injected cleaning liquid can be varied, and is selected in dependence upon the power output which is currently delivered by the internal combustion engine in each case.

9. The cleaning method as claimed in claim 2, wherein the cleaning liquid is heated before injecting into the flow passage.

10. The cleaning method as claimed in claim 3, wherein the cleaning liquid is heated before injecting into the flow passage.

11. The cleaning method as claimed in claim 4, wherein the cleaning liquid is heated before injecting into the flow passage.

12. The cleaning method as claimed in claim 2, wherein the quantity of injected cleaning liquid is 0.1-1.0 liter/min per $m^3/s$ of exhaust gas.

13. The cleaning method as claimed in claim 3, wherein the quantity of injected cleaning liquid is 0.1-1.0 liter/min per $m^3/s$ of exhaust gas.

14. The cleaning method as claimed in claim 4, wherein the quantity of injected cleaning liquid is 0.1-1.0 liter/min per $m^3/s$ of exhaust gas.

15. The cleaning method as claimed in claim 5, wherein the quantity of injected cleaning liquid is 0.1-1.0 liter/min per $m^3/s$ of exhaust gas.

* * * * *